REMOTE CONTROL SYSTEM FOR BROADCAST RECEIVERS

Filed June 24, 1954 2 Sheets-Sheet 1

INVENTOR.
GEORGE W. DEXTER,
BY E. A. Osm.

REMOTE CONTROL SYSTEM FOR BROADCAST RECEIVERS

Filed June 24, 1954 2 Sheets-Sheet 2

INVENTOR.
GEORGE W. DEXTER,
BY E. A. Oser.
AGENT.

United States Patent Office 2,806,900
Patented Sept. 17, 1957

2,806,900

REMOTE CONTROL SYSTEM FOR BROADCAST RECEIVERS

George W. Dexter, Los Angeles, Calif.

Application June 24, 1954, Serial No. 439,030
8 Claims. (Cl. 178—5.8)

Figure 1:
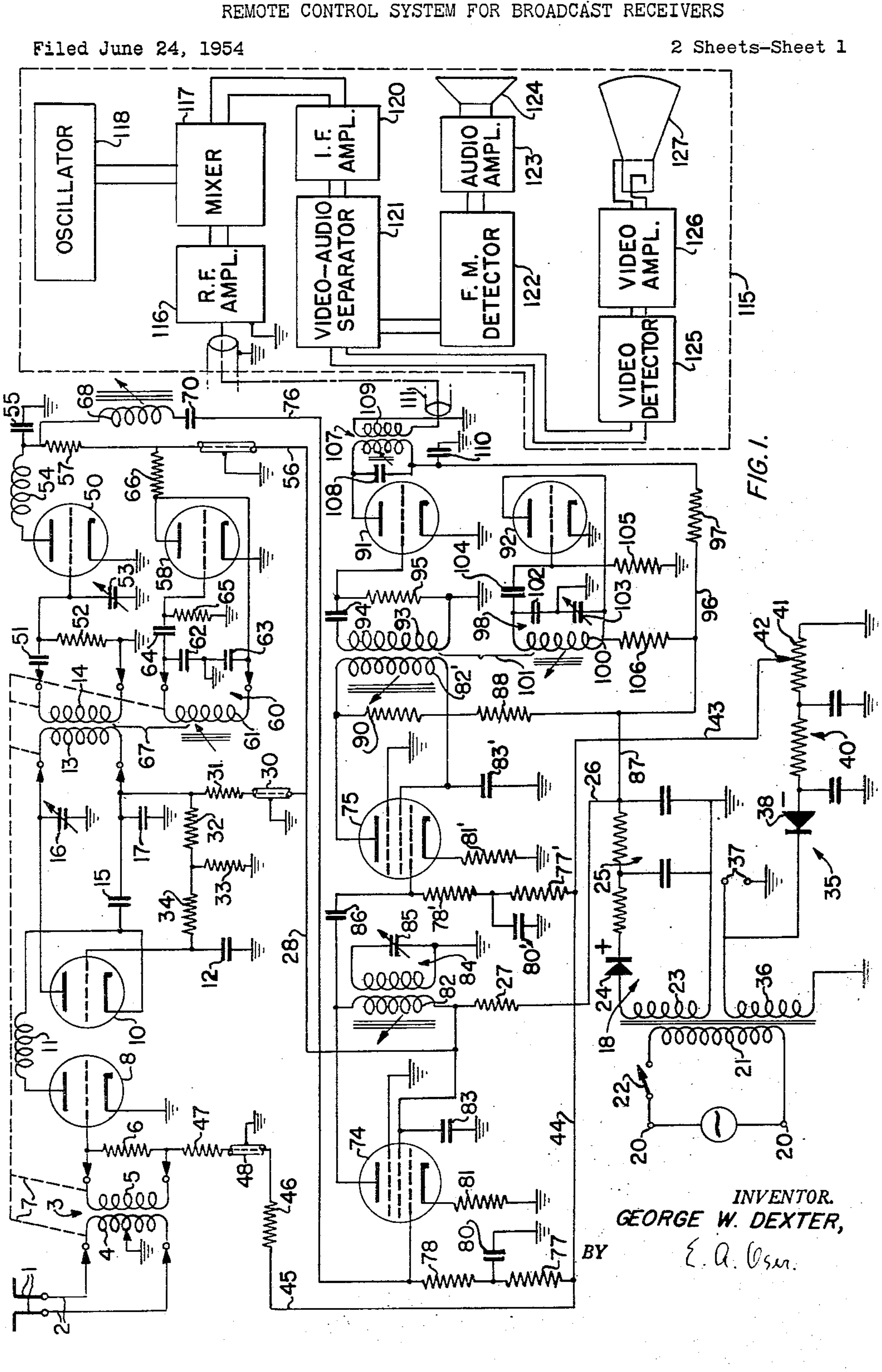

This invention relates generally to broadcast receivers, and particularly relates to a remote control system for a superheterodyne, such as a television receiver.

The need for a remote control of a television receiver has long been recognized. In recent years the trend has been toward television image reproducing tubes of larger image size. A television receiver with such a large television tube is difficult to tune directly from the set because the television image can only be viewed from a considerable distance. Furthermore, patients in hospitals viewing television images from a bed must be able to control the receiver from their bed. Consequently, various remote control units for television receivers have previously been suggested.

It is, of course, generally desirable to select not only the desired channel from a remote control point but also to control remotely the picture as well as the audio gain. Separate control of the video signal amplitude and of the audio signal amplitudes can normally not be effected unless either or both signals have been demodulated. Therefore, a remote control unit for a television receiver which provides separate audio and video signal gain control includes a major portion of the superheterodyne receiver. Hence, such a remote control unit cannot be connected to the receiver by a layman but this work must be done by a service man which increases the cost of such a control unit. Furthermore, once the remote control unit is installed, it cannot be disconnected without the help of an experienced service man. For this reason, remote control units for television receivers have not found general favor with the public.

It may also be pointed out that even a remote control unit which only permits remote channel selection will be generally unsatisfactory unless considerable amplification of the selected carrier wave is obtained. Otherwise, the signal-to-noise ratio will deteriorate to such an extent that weak stations cannot be received. The reason will be quite obvious because a relatively long cable required to connect the remote control unit to the television receiver will pick up noise. Hence, for any remote control unit, it is almost imperative to provide considerable amplification of the radio-frequency (R. F.) carrier wave before it is impressed on the receiver. Generally, such amplification can only be obtained at an intermediate frequency (I. F.) and not at the received carrier or radio frequency.

It is, accordingly, an object of the present invention to provide an improved remote control system for a broadcast receiver, such as a television receiver, which can be connected directly between the antenna and the input terminals of the receiver without requiring any changes of the receiver.

A further object of the invention is to provide a remote control system of the character referred to which permits an independent control of the gain of the video signal and that of the audio signal at a remote location.

Another object of the invention is to provide a remote control system for a superheterodyne receiver, and particularly a television receiver, which will amplify the selected modulated carrier wave before it is impressed on the input terminals of the receiver.

A remote control system for a broadcast receiver, and particularly for a television receiver, in accordance with the present invention, comprises a tunable input network for selecting and receiving a desired modulated carrier wave. In the case of a television receiver, the modulated carrier wave actually consists of a pair of carrier waves, one being modulated by a video signal, while the other one is modulated by an audio signal. The input network may include an R. F. amplifier. The input network is followed by a first mixer and a first local oscillator, the oscillator being also tunable for station selection. The output of the first mixer is a first I. F. carrier wave which is amplified by one or more I. F. amplifiers. Finally, the I. F. amplifier channel is followed by a second mixer and second oscillator, the oscillator being tuned to a fixed frequency to develop a second I. F. signal. This second I. F. carrier wave is impressed on the input terminals of the superheterodyne receiver.

A remote control system, as described so far, provides considerable amplification so that the second I. F. wave may be transmitted over a relatively long transmission line to the receiver without reducing the signal-to-noise ratio below a usable level. Furthermore, the system provides channel selection by tuning of the R. F. input network and of the first oscillator. However, the described system does not provide either video or audio gain control. It may be pointed out that the system, as outlined so far, may be used with advantage as a television booster station located at a remote antenna. Frequently, reception is impossible at a residence which is shielded from one or more broadcast stations by surrounding hills. By mounting the television antenna on a suitable hill, good reception may often be obtained. In that case, however, the signal must be conveyed by a long transmission line from the antenna to the residence. Thus, a booster station disposed directly at the antenna may provide good reception in what is otherwise a marginal reception area.

A combined video and audio gain control may very simply be provided by impressing the usual gain control voltage on an I. F. or R. F. amplifier. In order to obtain separate gain control of the audio signal, a resonant circuit is provided, in accordance with the present invention, which is coupled to the output circuit of the I. F. amplifier. This resonant circuit is tunable within a frequency range which includes the audio carrier but excludes the video carrier and its modulation bands. By controlling the resonant frequency of this resonant circuit, a controllable portion of the audio carrier wave may be absorbed by the resonant circuit, thereby to control the audio carrier amplitude independently of the video carrier amplitude, which may be adjusted by the conventional gain control voltage applied to an amplifier.

Figure 2:
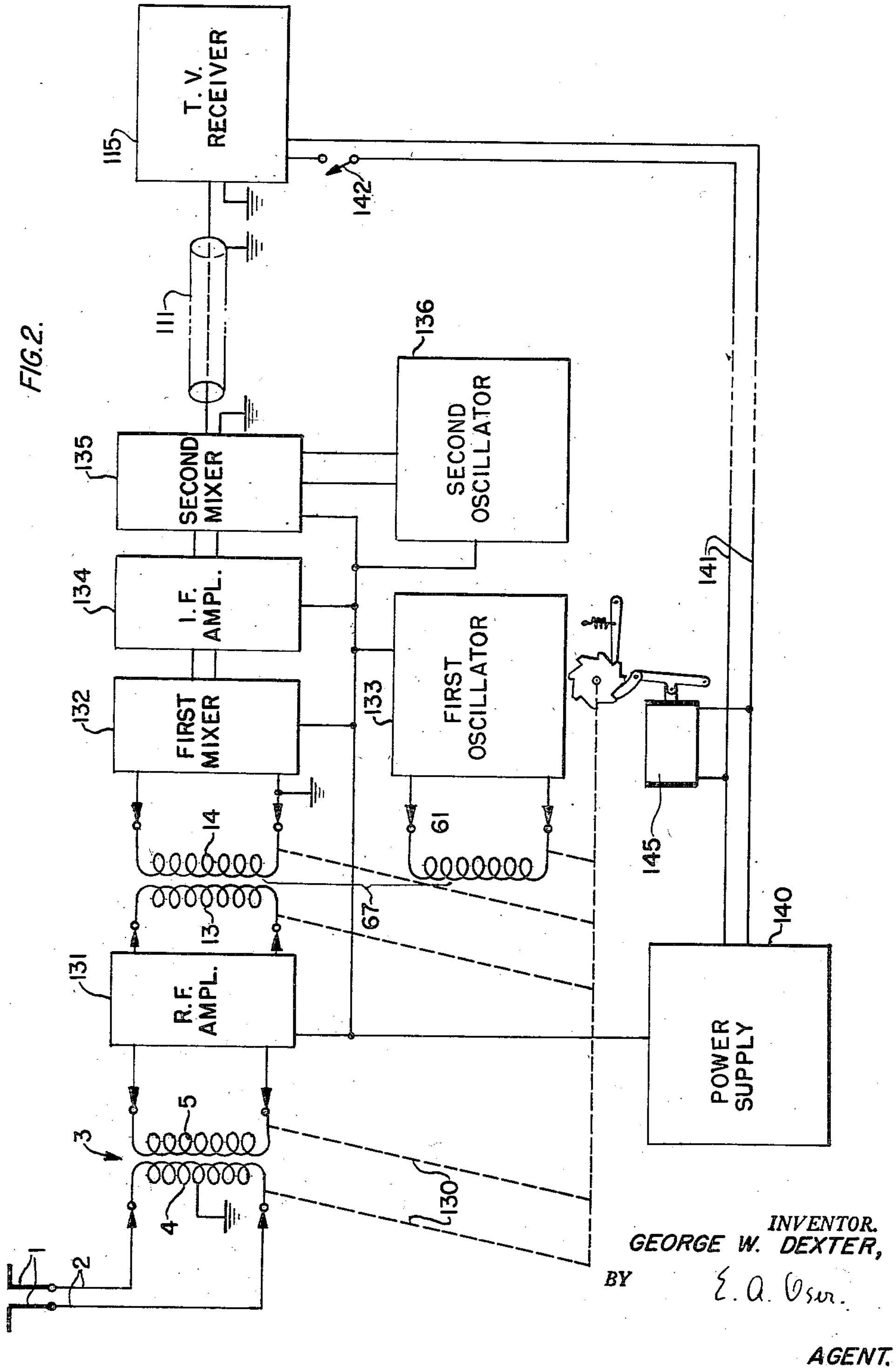

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 1 is a circuit diagram, partly in block form, of a remote control system embodying the present invention and of a television receiver controlled by the system of the invention; and Fig. 2 is a block diagram of a remote booster station for a broadcast such as a television receiver in accordance with the present invention.

Referring now to the drawings, and particularly to Fig. 1, there is illustrated a remote control system for a television receiver. The control system of the invention includes an antenna 1 for intercepting modulated carrier waves such as a television carrier wave including an audio-modulated carrier wave and a video-modulated carrier wave. By means of a transmission line 2, which may be a parallel wire line as shown, the antenna 1 is coupled to an input transformer 3 having a primary inductor 4 and a secondary inductor 5. The midpoint of the primary inductor 4 may be grounded as shown. The inductors 4 and 5 may be tuned by distributed capacitance and are damped by a resistor 6 connected across the secondary inductor 5 to provide a pass band of the required width. Inductors 4 and 5 may be exchanged for another pair of inductors for providing a pass band for different channels. This may, for example, be effected by a conventional turret tuner as indicated by the dotted lines 7 or by other conventional tuning means.

The thus selected carrier wave is amplified by two R. F. amplifier stages 8 and 10 connected in cascade. The amplifiers 8 and 10 preferably are triodes as shown to reduce the noise when amplifying the relatively high frequency signals of a television carrier wave. The amplifiers 8 and 10 are connected to form a well-known "cascode" amplifier. The cathode of amplifier 8 is grounded while the upper terminal of inductor 5 is connected to the control grid of the amplifier. The resistor 6 is grounded in a manner to be explained shortly. The anode of amplifier 8 is connected to the cathode of amplifier 10 through an inductor 11. The control grid of amplifier 10 is grounded through a bypass capacitor 12 to bypass signal frequency currents. The anode of amplifier 10 is connected to an inductor 13 forming the plate load and representing the primary inductor of a transformer having a secondary inductor 14. The other terminal of load inductor 13 is coupled by coupling capacitor 15 to the cathode of amplifier 10. A capacitor 16, which may be adjustable as shown, is connected between the anode of amplifier 10 and ground while another capacitor 17 is connected between the lower terminal of inductor 13 and ground. Hence capacitors 16 and 17 are connected in series with each other and across inductor 13 to provide a parallel resonant circuit. Inductors 13 and 14 may be exchanged for another pair of inductors in unison with inductors 4 and 5 to provide a proper pass band for a selected carrier wave.

The anode voltage supply for the amplifiers 8 and 10 is developed by a conventional rectifier and filter circuit 18. The power input terminals 20 are connected to a suitable alternating current supply such as the house main line, as indicated, and energize a primary winding 21 when a series switch 22 is closed. Switch 22 will control the energization of the entire remote control system. The secondary winding 23 is coupled to the primary winding 21 and has one terminal grounded as shown while its other terminal is connected to a crystal rectifier 24 followed by a filter circuit 25. A positive voltage is obtained from lead 26 connected to resistor 27 and in turn to another lead 28. Lead 28 may be shielded through a grounded cable, as shown at 30, and is connected through another voltage dropping resistor 31 to the junction point of tuning capacitor 17 and inductor 13. The anode voltage hence will flow from resistor 31 through inductor 13, amplifier 10, inductor 11 and amplifier 8 to ground.

Grid bias voltage is supplied to the control grid of amplifier 10 through a voltage divider, including resistors 32 and 33 connected in series between resistor 31 and ground. The junction point of resistors 32 and 33 is connected to the control grid of amplifier 10 through insulating resistor 34.

For the purpose of providing a gain control voltage, there may be arranged another rectifier circuit 35. The rectifier circuit 35 includes a tertiary winding 36 magnetically coupled to the primary winding 21. One terminal of the tertiary winding 36 is grounded as shown while the other terminal may be connected to another crystal rectifier 38. The output terminals 37 are connected across the tertiary winding 36 and may be utilized to energize the filaments of amplifiers 8 and 10 as well as those of the other amplifiers of the control system to be described hereinafter. The crystal rectifier 38 is followed by a filter network 40 and a resistor 41 is connected between the filter network 40 and ground to provide a source of negative voltage. By means of tap 42 on resistor 41, a variable negative voltage may be obtained which may be impressed on amplifier 8 to provide gain control. To this end, the tap 42 may be connected to the control grid of amplifier 8 by leads 43, 44, 45 and by resistors 46, 47 and 6. This path provides ground for the control grid of amplifier 8. The gain control voltage leads 43, 44 and 45 may be shielded by a grounded cable indicated at 48.

The operation of the R. F. input circuit as described so far will now be ogvious. The desired channel is selected by proper choice of the inductors 4, 5 and 13, 14 by the unicontrol means 7, such as a turret tuner. The thus elected carrier wave which consists properly speaking of a pair of adjacent carrier waves for the audio and video signals is amplified by the cascode amplifier 8, 10 in a conventional manner. The proper band width of the input circuit is obtained by the damping resistor 6 connected across the secondary inductor 5. The amplified output signal is developed across the inductor 13 which is tuned by capacitors 16 and 17, of which capacitor 16 may be adjustable as shown. By means of the resistor network 32, 33 and 34, a grid bias voltage is impressed on the grid of amplifier 10. The grid bias voltage of amplifier 8 is determined by the setting of potentiometer tap 42 which controls the amplifier gain in a conventional manner.

The R. F. amplifier stages 8, 10 are followed by a first mixer 50 which preferably consists of a triode as shown, having its cathode grounded. The ungrounded terminal of inductor 14 is coupled by a coupling capacitor 51 which also serves as a blocking capacitor to the control grid of mixer stage 50. The control grid is grounded by grid leak resistor 52. A capacitor 53 is connected across inductor 14 and may be adjustable as shown. Capacitor 53 provides a parallel resonant circuit with inductor 14 for the amplified R. F. carrier wave. The anode of mixer 50 is grounded through an inductor 54 and capacitor 55 serially connected to form a series resonant circuit. The desired output signal is developed across the inductor 54 as will be more fully explained hereinafter. The power supply 18 is connected to the anode of mixer 50 through lead 26, resistor 27, leads 28, 56, resistor 57 and inductor 54.

A first oscillation generator including a triode 58 is coupled to the mixer stage 50. The cathode of oscillator tube 58 is grounded and a parallel resonant circuit 60 is coupled between the grid and plate of tube 58 to provide a Hartley oscillator. The parallel resonant circuit 60 includes an inductor 61 and two capacitors 62 and 63 connected across the inductor 61 and having their junction point grounded. Inductor 61 may have an adjustable core as indicated. Inductor 61 may be exchanged for other inductors to control the oscillatory frequency of the generator. As indicated by the dotted lines 7, inductor 61 is exchangeable in unison with the inductors 4, 5 and 13, 14. One terminal of inductor 61 is directly connected to the plate of triode 58 while the other terminal is coupled by coupling and blocking capacitor 64 to the control grid thereof. The control grid is grounded by grid leak resistor 65. The plate of the triode 58 is supplied with a suitable plate voltage through power supply lead 56 and dropping resistor 66.

It will be obvious that the oscillation generator is a conventional Hartley oscillator and further description of its operation is unnecessary here. The inductor 61 is inductively coupled to the inductor 14 as indicated by the bracket 67. Energy at the oscillatory frequency is thus impressed across the inductor 14 and the R. F.

carrier energy is mixed with the oscillatory energy in the mixer. The series resonant circuit 54, 55 may be tuned to the first intermediate frequency of the system and may be used to bypass the oscillatory energy to ground. Further frequency selection may be obtained by an inductor 68 and capacitor 70 connected in series with the junction point of inductor 54 and resistor 57. Inductor 68 may have an adjustable core as shown.

The carrier waves to be selected may, for example, be in the V. H. F. (very high frequency) television range from 50 to 118 mc. (megacycles per second). Further by way of example, the frequency of the oscillation generator 58 which is the first local oscillator may be 25.75 mc. higher than the frequency of the video carrier to be selected. If the resonant circuits 54, 55 and 68, 70 are tuned to select the difference frequency of the oscillator frequency and of the radio frequency of the received wave, the intermediate frequency will be 25.75 mc. for the video carrier. At the same time, the intermediate frequency of the audio carrier will be 21.25 mc. since in accordance with present television standards there is a constant frequency difference between the audio and the video carrier waves of 4.5 mc.

This first I. F. signal is now amplified by two successive I. F. amplifier stages 74 and 75 which may both be pentodes as shown. A lead 76 connects the series resonant circuit 68, 70 to the control grid of pentode 74. The control grid is further connected to the gain control leads 43, 44 by resistors 77 and 78, the junction point of which is grounded through filter capacitor 80. The cathode of pentode 74 is grounded through an unbypassed resistor 81. The plate of pentode 74 is connected to the plate voltage supply through lead 26, resistor 27 and inductor 82 which may have an adjustable core as shown. The suppressor grid of pentode 74 is grounded and the screen grid is connected to the junction point of resistor 27 and inductor 82 and is bypassed to ground by filter capacitor 83. A parallel resonant circuit 84 is inductively coupled to inductor 82 and has a variable capacitor 85. One terminal of the parallel resonant circuit 84 is grounded. The purpose of the parallel resonant circuit 84 will be more fully explained hereinafter.

An amplified I. F. signal is developed across the inductor 82 which serves as a plate load, and is impressed through coupling capacitor 86 on the control grid of pentode 75. Since the circuit of pentode 75 is identical to that of pentode 74, it need not be further described here and similar elements have been designated with the same reference numbers primed. The plate of pentode 75 is supplied with a suitable voltage through lead 87, resistor 88 and inductor 82'. Inductor 82' may have an adjustable core as shown. Resistor 90 is connected across inductor 82' and serves as a damping resistor to provide the desired band width. Inductors 82 and 82' may be tuned by distributed capacitance.

Gain control for both the video and audio carrier waves is obtained by adjustment of tap 42 on potentiometer resistor 41. This negative gain control voltage is impressed on the control grids of R. V. amplifier 8 and of I. F. amplifiers 74 and 75. As explained hereinbefore, this adjustment does, however, not permit independent control of the audio carrier amplitude. For this latter purpose, there is provided in accordance with the present invention the parallel resonant circuit 84. This circuit is normally tuned to a frequency below that of the audio carrier which amounts to 21.25 mc. in the present example. Since the video carrier frequency is 25.75 mc., the circuit 84 will have no effect on the video carrier and its modulation side bands. By increasing the resonant frequency of resonant circuit 84 by adjustment of capacitor 85, the frequency of circuit 84 may be made to approach that of the audio carrier. Hence, a larger amount of the audio carrier wave is absorbed by the circuit 84 which may be considered a variable wave trap. In this manner, a larger or smaller portion of the audio carrier wave and hence of the audio signal may be absorbed while the gain of both carrier waves is controlled in unison by tap 42.

The I. F. amplifier 75 is followed by a second mixer and a second local oscillator. To this end there is provided a second mixer tube 91 and a second oscillator tube 92, both of which may be triodes as shown. An inductor 93 is coupled to the inductor 82' and has one terminal grounded while its other terminal is coupled to the control grid of triode 91 by coupling capacitor 94. The control grid is grounded by a grid leak resistor 95. The anode of triode 91 is supplied with anode voltage through leads 87, 96, resistor 97 and parallel resonant circuit 107. The local oscillator 92 is substantially identical to the oscillator 58 except that its resonant circuit 98 is not tunable but may be adjustable. The resonant circuit 98 includes an inductor 100 which may have an adjustable core as shown and which is inductively coupled to inductor 93 as indicated at 101. Two capacitors 102 and 103 are connected across inductor 100 and their junction point is grounded. One terminal of the parallel resonant circuit 98 is connected to the anode of triode 92 while the other terminal is coupled to the control grid thereof by coupling capacitor 104. The control grid is grounded by grid leak resistor 105. The anode of triode 92 is supplied with anode voltage through leads 87, 96 and resistor 106.

The second local oscillator 92 is a Hartley oscillator and its oscillatory energy is injected into inductor 93 of the mixer 91. Assuming again that the first intermediate frequency is 25.75 mc. for the video carrier and 21.25 mc. for the audio carrier, the frequency of the output wave obtained from mixer 91 may, for example, be 61.25 mc. for the video carrier and 65.75 for the audio carrier corresponding to television channel 3 or any other unused channel. In that case, the frequency of the second local oscillator 92 may be 87.00 mc. By selecting again the difference frequency of the oscillatory wave having a frequency of 87 mc. and of the I. F. video carrier of 25.75 mc. an output video carrier of 61.25 mc. is obtained which may be designated the second intermediate frequency. For the first I. F. audio carrier having a frequency of 21.25 mc. we obtain an output or second I. F. wave of a frequency of 65.75 mc. It will of course be understood that if desired, the capacitor 103 may be adjusted to develop an output wave of a different frequency. In that case the television receiver may be tuned to another television channel to receive the output or second I. F. wave of the remote control system of the invention. Preferably, the second I. F. wave has a frequency corresponding to that of an unused channel to reduce the possibility of interference by radiation.

The parallel resonant circuit 107 connected to the plate of mixer 91 serves as the plate load and includes a capacitor 108; its inductor may be provided with an adjustable core as indicated. Inductor 109 is inductively coupled to the resonant mixer output circuit 107 and has its terminals connected to a suitable transmission line 111 which may be a coaxial line as shown, having its outer conductor grounded. Capacitor 110 bypasses the junction point of resonant circuit 107 and resistor 97 to ground for signal frequency currents.

In accordance with the present invention, the transmission line 111 may be directly connected to the input terminals of a conventional television receiver of the superheterodyne type indicated by the dotted lines 115. The receiver 115 may have an R. F. amplifier 116 which is tunable in any conventional manner. In will, however, be understood that the R. F. amplifier 116 may be omitted to provide simply a tuned input circuit. In any case, the R. F. amplifier or input circuit 116 is connected to the transmission line 111 and provides further frequency selection. The R. F. amplifier 116 is followed by a mixer 117 and local oscillator 118 which may be considered the third mixer and the third oscillator, the latter being tunable for station selection as is conventional. The I. F.

wave obtained from mixer 117 may be amplified by an I. F. amplifier 120 followed by a video and audio separator 121 which may simply be a suitable band pass circuit to separate the video and audio carrier waves. The audio carrier wave which is a frequency-modulated (FM) carrier wave may be detected by an F. M. detector 122 to develop the audio signal which is amplified by an audio amplifier 123 and reproduced by a loudspeaker 124.

The video carrier wave obtained from the separator 121 is detected by the video detector 125 to develop the video signal. The video signal is amplified by a video amplifier 126 and its output is connected to the cathode and control grid of the cathode ray or picture signal reproducing tube 127. For the sake of simplicity, the deflection circuits for the cathode ray tube have been omitted. It will be understood that while the television receiver 115 has been shown with separate audio and video detectors, it is also feasible to use a receiver utilizing intercarrier sound as is now well-known.

The operation of the remote control system and television receiver has already been explained. In particular, it will be obvious that the gain of the picture and audio carrier waves is controlled simultaneously by variation of the tap 42 of the potentiometer 41. The amplitude of the audio carrier wave may be controlled independently by adjustment of the tuning capacitor 85 of the parallel resonant circuit 84. By reason of the fact that the double superheterodyne arrangement of the remote control system of the invention permits a relatively low first intermediate frequency, it is possible to provide substantial gain in the remote system before the signal is impressed on the transmission line 111. Hence, regardless of the length of the line 111, the signal-to-noise ratio will be quite favorable. On the other hand, the double superheterodyne arrangement makes it possible to supply the receiver 115 with a signal of a carrier frequency corresponding to that of any desired television channel. Hence, it is possible to connect the output line 111 of the remote control system directly to the antenna input terminals of the receiver without making any changes in the receiver proper.

It will be understood that the circuit specifications of the remote control system of the invention may vary according to the design for any particular application. The following circuit specifications are included, by way of example only, as suitable for a control system for receiving video signal and audio signal modulated carrier waves and for impressing them on a conventional television receiver:

| | |
|---|---|
| Triode **8** | ½ type 6BQ7A. |
| Triode **10** | ½ type 6BQ7A. |
| Triode **50** | ½ type 6J6. |
| Triode **58** | ½ type 6J6. |
| Pentode **74** | type 6AU6. |
| Pentode **75** | type 6AU6. |
| Triode **91** | ½ type 6J6. |
| Triode **92** | ½ type 6J6. |
| Resistor **6** | 15,000 Ohms. |
| Resistor **34** | 100,000 Ohms. |
| Resistor **33** | 160,000 Ohms. |
| Resistor **32** | 100,000 Ohms. |
| Resistor **31** | 1500 Ohms. |
| Resistor **27** | 1000 Ohms. |
| Resistor **46** | 1000 Ohms. |
| Resistor **47** | 47,000 Ohms. |
| Resistor **52** | 230,000 Ohms. |
| Resistor **57** | 8,200 Ohms. |
| Resistor **65** | 10,000 Ohms. |
| Resistor **66** | 15,000 Ohms. |
| Resistor **77** | 1000 Ohms. |
| Resistor **78** | 10,000 Ohms. |
| Resistor **81** | 47 Ohms. |
| Resistor **77'** | 1000 Ohms. |
| Resistor **78'** | 10,000 Ohms. |
| Resistor **81'** | 47 Ohms. |
| Resistor **88** | 1000 Ohms. |
| Resistor **90** | 10,000 Ohms. |
| Resistor **95** | 220,000 Ohms. |
| Resistor **105** | 10,000 Ohms. |
| Resistor **97** | 15,000 Ohms. |
| Resistor **106** | 4,700 Ohms. |
| Resistor **41** | 50,000 Ohms. |
| Capacitor **15** | 1.5 micro-microfarads. |
| Capacitor **16** | 0.5 to 3 micro-microfarads. |
| Capacitor **17** | 47 micro-microfarads. |
| Capacitor **12** | 800 micro-microfarads. |
| Capacitor **53** | 0.5 to 3 micro-microfarads. |
| Capacitor **51** | 47 micro-microfarads. |
| Capacitor **55** | 6.8 micro-microfarads. |
| Capacitor **62** | 5 micro-microfarads. |
| Capacitor **63** | 2 micro-microfarads. |
| Capacitor **64** | 10 micro-microfarads. |
| Capacitor **70** | 120 micro-microfarads. |
| Capacitor **80** | 0.0015 microfarad. |
| Capacitor **80'** | 0.0015 microfarad. |
| Capacitor **83** | 0.0015 microfarad. |
| Capacitor **83'** | 0.0015 microfarad. |
| Capacitor **85** | 3 to 15 micro-microfarads (across which is connected a fixed capacitor of 56 micro-microfarads). |
| Capacitor **86** | 250 micro-microfarads. |
| Capacitor **94** | 100 micro-microfarads. |
| Capacitor **102** | 10 micro-microfarads. |
| Capacitor **103** | 3 to 12 micro-microfarads. |
| Capacitor **104** | 20 micro-microfarads. |
| Capacitor **108** | 50 micro-microfarads. |
| Capacitor **110** | .0015 microfarad. |

As previously discussed, the remote control system of the invention may also be used with advantage as a booster station for a television receiver. In this case it will be assumed that the television antenna is located remote from the residence containing the television receiver. Such a system has been illustrated in Fig. 2 to which reference is now made. In Fig. 2 similar elements have been identified by the same reference numerals as were used in Fig. 1. The remote antenna 1 may be connected by a parallel transmission line 2 to the input circuit of the remote system including an input transformer 3 having a primary inductor 4 with its center point grounded and a secondary inductor 5. Transformer 3 is exchangeable with another transformer for station selection as indicated by the dotted lines 130. The input transformer 3 is followed by an R. F. amplifier 131 which may be identical to that shown in Fig. 1. The amplified R .F. signal is developed across the primary output inductor 13 coupled to the secondary inductor 14. Both inductors 13, 14 may be exchanged for another pair of inductors to provide a pass band for the selected channel. Mixer 132 follows the transformer 13, 14 and may be identical to the mixer illustrated in Fig. 1. Oscillator 133 is coupled to the mixer 132 in any suitable manner. By way of example, the oscillator 133 includes the inductor 61 which may be exchanged together with the other inductors as shown by the lines 130. Inductors 61 and 14 are coupled as indicated at 67.

The mixer 132 is followed by an I. F. amplifier 134 and by a second mixer 135 coupled to the second local oscillator 136. The operation of the double superheterodyne circuit may be identical to that described in connection with Fig. 1. The second I. F. signal may be impressed by the coaxial transmission line 111 on the television receiver 115 which may be of any conventional type.

A power supply 140 indicated schematically is fed with a suitable alternating current supply through the leads 141 controlled by a switch 142, preferably from the remote location of the receiver 115. Thus by closing the switch 142, the remote control system may be energized.

However, it is still possible to accomplish tuning of the remote control system. To this end, the turret tuner indicated at 130 or the like is controlled by a stepping relay 145 in response to opening and closing of switch 142. In other words, every time switch 142 is opened and closed, the stepping relay 145 will rotate another step to tune the remote control system to another channel. As indicated previously, the inductors 4, 5 and 13, 14 and 61 are simultaneously changed to accomplish tuning from a remote location.

In the system of Fig. 2, gain control of either the video or the audio carrier is not provided. However, such gain control may easily be effected at the receiver 115. The system of Fig. 2 has essentially the same advantages as that of Fig. 1 and is capable of delivering a signal to the receiver 115 which may be demodulated in a conventional manner without the necessity of changing the set in any manner. Furthermore, the signal-to-noise ratio is materially improved by the high amplification provided particularly by the I. F. amplifier stages.

It will be understood that the remote control system of the invention may also be utilized as an U. H. F. converter. In that case, the R. F. amplifier, first mixer and first local oscillator must be designed for the reception, conversion and amplification of U. H. F. waves and this may readily be done by those skilled in the art. Otherwise, such a U. H. F. converter and remote control system operates in the manner previously outlined.

What is claimed is:

1. A remote control system for a television receiver comprising a resonant input network tunable within a predetermined portion of the frequency spectrum to receive a desired pair of carrier waves, one of said carrier waves being modulated by a video signal, the other one of said carrier waves being modulated by an audio signal, a first mixer coupled to said input network, a first oscillator coupled to said first mixer and tunable over another portion of the frequency spectrum, said first mixer having an output circuit tuned to a first predetermined intermediate frequency, an intermediate frequency amplifier coupled to the output circuit of said first mixer, said intermediate frequency amplifier having an output circuit, a second mixer coupled to the output circuit of said intermediate frequency amplifier, a second oscillator coupled to said second mixer and tuned to a predetermined fixed frequency, said second mixer having an output circuit tuned to a second predetermined intermediate frequency, the output circuit of said second mixer being adapted to be connected to the input terminals of a television receiver, a source of a variable gain control voltage, means for connecting said source to said intermediate frequency amplifier to vary the gain thereof, and a resonant circuit coupled to the output circuit of said intermediate frequency amplifier, said resonant circuit being tunable over a frequency range including the intermediate frequency of said audio modulated carrier wave, thereby to control the gain of said audio modulated carrier wave independently of that of said amplifier controlling the gain of both of said carrier waves.

2. A remote control system for a television receiver comprising a resonant input network tunable within a predetermined portion of the frequency spectrum to receive a desired pair of carrier waves, one of said carrier waves being modulated by a video signal, the other one of said carrier waves being modulated by an audio signal, a radio frequency amplifier included in said input network, a first mixer coupled to said input network, a first oscillator coupled to said first mixer and tunable over another portion of the frequency spectrum, said first mixer having an output circuit tuned to a first predetermined intermediate frequency, an intermediate frequency amplifier coupled to the output circuit of said first mixer, said intermediate frequency amplifier having an output circuit, a second mixer coupled to the output circuit of said intermediate frequency amplifier, a second oscillator coupled to said second mixer and tuned to a predetermined fixed frequency, said second mixer having an output circuit tuned to a second predetermined intermediate frequency, the output circuit of said second mixer being adapted to be connected to the input terminals of a television receiver, a source of a variable gain control voltage, means for connecting said source to said radio frequency amplifier and to said intermediate frequency amplifier to vary the gain thereof, and a parallel resonant circuit coupled to the output circuit of said intermediate frequency amplifier, said parallel resonant circuit being tunable over a frequency range including the intermediate frequency of said audio modulated carrier wave, thereby to control the gain of said audio modulated carrier wave independently of that of said amplifiers controlling the gain of both of said carrier waves.

3. A remote control system for a television receiver comprising a resonant input network tunable within a predetermined portion of the frequency spectrum to receive a desired pair of carrier waves, one of said carrier waves being modulated by a video signal, the other one of said carrier waves being modulated by an audio signal, a radio frequency amplifier included in said input network, a first mixer coupled to said input network, a first oscillator coupled to said first mixer and tunable over another portion of the frequency spectrum, unicontrol means for tuning said input network and said first oscillator to receive a desired channel, said first mixer having an output circuit tuned to a first predetermined intermediate frequency, an intermediate frequency amplifier coupled to the output circuit of said first mixer, said intermediate frequency amplifier having an output circuit, a second mixer coupled to the output circuit of said intermediate frequency amplifier, a second oscillator coupled to said second mixer and tuned to a predetermined fixed frequency, said second mixer having an output circuit tuned to a second predetermined intermediate frequency, a transmission line connected to the output circuit of said second mixer and adapted to be connected to the input terminals of a television receiver, a source of a variable gain control voltage, means for connecting said source to said radio frequency amplifier and to said intermediate frequency amplifier to vary the gain thereof, and a parallel resonant circuit coupled to the output circuit of said intermediate frequency amplifier, said parallel resonant circuit being tunable over a frequency range including the intermediate frequency of said audio modulated carrier wave, thereby to control the gain of said audio modulated carrier wave independently of that of said amplifiers controlling the gain of both of said carrier waves.

4. A remote control system for a television receiver comprising a resonant input network tunable within a predetermined portion of the frequency spectrum to receive a desired pair of carrier waves, one of said carrier waves being modulated by a video signal, the other one of said carrier waves being modulated by an audio signal, a first mixer coupled to said input network, a first oscillator coupled to said first mixer and tunable over another portion of the frequency spectrum, said first mixer having an output circuit tuned to a first predetermined intermediate frequency, an intermediate frequency amplifier coupled to the output circuit of said first mixer, said intermediate frequency amplifier having an output circuit, a second mixer coupled to the output circuit of said intermediate frequency amplifier, a second oscillator coupled to said second mixer and tuned to a predetermined fixed frequency, said second mixer having an output circuit tuned to a second predetermined intermediate frequency, the output circuit of said second mixer being adapted to be connected to the input terminals of a television receiver, and a resonant circuit coupled to the output circuit of said intermediate frequency amplifier, said resonant circuit being tunable over a frequency range including the intermediate frequency of one of said modulated carrier waves, thereby to control the gain of said one of said modulated carrier waves.

5. A remote control system for a television receiver comprising a resonant input network tunable within a predetermined portion of the frequency spectrum to receive a desired pair of carrier waves, one of said carrier waves being modulated by a video signal, the other one of said carrier waves being modulated by an audio signal, a radio frequency amplifier included in said input network, a first mixer coupled to said input network, a first oscillator coupled to said first mixer and tunable over another portion of the frequency spectrum, said first mixer having an output circuit tuned to a first predetermined intermediate frequency, an intermediate frequency amplifier coupled to the output circuit of said first mixer, said intermediate frequency amplifier having an output circuit, a second mixer coupled to the output circuit of said intermediate frequency amplifier, a second oscillator coupled to said second mixer and tuned to a predetermined fixed frequency, said second mixer having an output circuit tuned to a second predetermined intermediate frequency, the output circuit of said second mixer being adapted to be connected to the input terminals of a television receiver, and a parallel resonant circuit coupled to the output circuit of said intermediate frequency amplifier, said parallel resonant circuit being tunable over a frequency range including the intermediate frequency of said audio modulated carrier wave, thereby to control the gain of said audio modulated carrier wave.

6. In a superheterodyne television receiving system, an intermediate frequency amplifier for amplifying a first carrier wave modulated by a video signal and a second carrier wave modulated by an audio signal, an output circuit for said amplifier, a resonant circuit coupled to the output circuit of said amplifier, means for continuously varying the resonant frequency of said resonant circuit over a frequency range outside that of one of said signal modulated carrier waves and its modulation bands and including that of the other one of said signal modulated carrier waves, thereby to absorb a controllable portion of the energy of said other one of said modulated carrier waves, a source of voltage, and means for applying a variable portion of the voltage of said source to said amplifier to control its gain for both of said carrier waves, whereby the amplitudes of said carrier waves may be controlled independently of each other.

7. In a superheterodyne television receiving system, an intermediate frequency amplifier for amplifying a first carrier wave modulated by a video signal and a second carrier wave modulated by an audio signal, an output circuit for said amplifier, a parallel resonant circuit coupled to the output circuit of said amplifier, means for continuously varying the resonant frequency of said parallel resonant circuit over a frequency range outside that of said video signal modulated carrier wave and its modulation bands and including said audio signal modulated carrier wave, thereby to absorb a controllable portion of the energy of said audio modulated carrier wave, a source of voltage, and means for applying a variable portion of the voltage of said source to said amplifier to control its gain for both of said carrier waves, whereby the amplitudes of said carrier waves may be controlled independently of each other.

8. In a superheterodyne television receiving system, an intermediate frequency amplifier for amplifying a first carrier wave modulated by a video signal and a second carrier wave modulated by an audio signal, an output circuit for said amplifier, a parallel resonant circuit coupled to the output circuit of said amplifier, and means for continuously varying the resonant frequency of said parallel resonant circuit over a frequency range outside that of said video signal modulated carrier wave and its modulation bands and including said audio signal modulated carrier wave, thereby to absorb a controllable portion of the energy of said audio modulated carrier wave.

References Cited in the file of this patent

UNITED STATES PATENTS

| | | |
|---|---|---|
| 2,039,107 | Nichols | Apr. 28, 1936 |
| 2,048,772 | Bauer | July 28, 1936 |
| 2,383,322 | Koch | Aug. 21, 1945 |
| 2,428,300 | Stott | Sept. 30, 1947 |
| 2,433,093 | Crosby | Dec. 23, 1947 |
| 2,492,943 | White | Dec. 27, 1949 |
| 2,598,857 | Sziklai | June 3, 1952 |
| 2,653,995 | Boyle | Sept. 29, 1953 |

OTHER REFERENCES

Coastwise Electronics Corp., Los Angeles, California model No. 501D television receiver remote control unit.